United States Patent
Hinton (10) Patent No.: US 11,703,171 B2
(45) Date of Patent: Jul. 18, 2023

(54) CAM-LEVER CLAMP

(71) Applicant: Dixon Valve & Coupling Company, LLC, Chestertown, MD (US)

(72) Inventor: Austen Hinton, Mukwonago, WI (US)

(73) Assignee: DIXON VALVE & COUPLING COMPANY, LLC, Chestertown, MD (US)

( * ) Notice: Subject to any disclaimer, the term of this patent is extended or adjusted under 35 U.S.C. 154(b) by 34 days.

(21) Appl. No.: 17/375,434

(22) Filed: Jul. 14, 2021

(65) Prior Publication Data

US 2022/0049805 A1 Feb. 17, 2022

Related U.S. Application Data

(60) Provisional application No. 63/065,137, filed on Aug. 13, 2020.

(51) Int. Cl.
*F16L 37/18* (2006.01)

(52) U.S. Cl.
CPC .................... *F16L 37/18* (2013.01)

(58) Field of Classification Search
CPC . F16L 23/06; F16L 23/10; F16L 23/04; F16L 37/18; F16L 33/12; F16L 21/06
USPC .................................... 285/312, 420
See application file for complete search history.

(56) References Cited

U.S. PATENT DOCUMENTS

| | | | | |
|---|---|---|---|---|
| 2,689,141 A * | 9/1954 | Kiekhaefer | ............ | F16L 23/06 |
| | | | | 285/410 |
| 2,775,806 A * | 1/1957 | Love | .............. | F16L 33/12 |
| | | | | 24/271 |
| 3,705,737 A * | 12/1972 | Westerlund | ............ | F16L 23/06 |
| | | | | 285/365 |
| 4,643,460 A | 2/1987 | Liegerg | | |
| 5,988,694 A * | 11/1999 | Brushaber | ............... | F16L 23/06 |
| | | | | 285/365 |
| 8,201,852 B2 * | 6/2012 | Linhorst | ................. | F16L 23/06 |
| | | | | 285/365 |
| 8,371,623 B2 * | 2/2013 | Bronnert | ................ | F16L 23/06 |
| | | | | 285/365 |
| 9,151,420 B2 | 10/2015 | McKiernan | | |
| 10,408,371 B2 | 9/2019 | Floyd | | |

(Continued)

FOREIGN PATENT DOCUMENTS

| | | | | |
|---|---|---|---|---|
| DE | 1957523 A1 * | 6/1971 | ............. | F16L 23/06 |
| FR | 1073967 A * | 9/1954 | ............. | F16L 23/06 |
| WO | WO-2017116650 A1 * | 7/2017 | ............. | F16L 23/06 |

*Primary Examiner* — Matthew Troutman
*Assistant Examiner* — Fannie C Kee
(74) *Attorney, Agent, or Firm* — Howson & Howson LLP (57) ABSTRACT

A substantially ring-shaped clamp has a first clamp body component joined to a second clamp body component in a manner permitting the first clamp body component to pivot relative to the second clamp body component. A shaft extends from the first clamp body component such that the shaft is able to pivot relative to the first clamp body component. The shaft has a free end that is receivable within and removable from a pocket formed in the second clamp body component. A cam-lever is connected to the first clamp body component in a manner permitting the cam-lever to pivot relative to the first clamp body component. The shaft may be a threadless shaft, and the clamp may be self-locking, adjustable, and/or have a relatively smooth outer periphery.

20 Claims, 13 Drawing Sheets

(56) References Cited

U.S. PATENT DOCUMENTS

2010/0038903 A1\* 2/2010 Linhorst ................. F16L 33/12
                                                                            285/365
2017/0191589 A1\* 7/2017 Floyd ...................... F16L 23/06

\* cited by examiner

FIG. 26
SECTION A-A

SECTION A-A
FIG. 29

CAM-LEVER CLAMP

CROSS REFERENCE TO RELATED APPLICATIONS

This application claims the benefit under 35 USC § 119(e) of U.S. Provisional Patent Application No. 63/065,137 filed Aug. 13, 2020.

BACKGROUND

The present invention relates to clamps or sanitary couplings for use in connecting tube and pipe ferrules, and more particularly, the present invention is directed to a clamp which is adjustable, self-locking, and includes a cam-lever for generating a desired level of tightening force.

A type of connection typically used, for instance, in the food, beverage, winery, brewery, and pharmaceutical industries is referred to as a so-called "tri-clamp" connection which is used to join two mating sections of tubing, piping or hose. Examples of such clamps are disclosed, for instance, in U.S. Pat. No. 4,643,460 issued to Lieberg, U.S. Pat. No. 9,151,420 B2 issued to McKiernan, and U.S. Pat. No. 10,408,371 issued to Floyd.

SUMMARY

According to an embodiment, a clamp is provided and has a first clamp body component joined to a second clamp body component such that the first clamp body component is able to pivot relative to the second clamp body component. A shaft extends from the first clamp body component such that said shaft is able to pivot relative to the first clamp body component. The shaft has a second free end receivable within and removable from a pocket provided in the second clamp body component. A cam-lever is connected to the first clamp body component in a manner permitting the cam-lever to pivot relative to the first clamp body component. According to embodiments, the shaft may be a threadless shaft, the clamp may be self-locking, the clamp may be adjustable to provide a desired amount of clamping force, and/or the clamp may be provided with a relatively smooth outer profile when the clamp is in a closed condition.

DETAILED DESCRIPTION

An example of a conventional so-called tri-clamp connection or union 10 is shown in FIGS. 1-4. Connection 10 includes two pipes, 12 and 14, having ends with ferrules, 16 and 18. The pipes and ferrules may be made of 300 series stainless steel, a like metal or alloy, a plastic material, a composite material, a flexible material for a hose or the like, or any other material which may be approved by a particular industry. By way of example, a typically diameter for a sanitary pipe may be 0.5 inch to 6 inches; however, tri-clamp unions may be readily made with pipes of smaller or larger diameters.

The connection 10 may also include an intermediate rubber, elastomeric, or plastic gasket 20 located between the facing ferrules, 16 and 18, for ensuring the formation of a fluid-tight seal therebetween when the pipes, 12 and 14, are clamped together. Accordingly, for purposes of securing the pipes, 12 and 14, together and for providing sufficient clamping force thereto to ensure the creation of a fluid-tight seal, the connection 10 includes a clamp 22 used to exert a force to clamp and compress together the ferrules, 16 and 18, and intermediate positioned gasket 20.

A typical clamp 22 includes a pair of clamp body halves, 24 and 26, secured together at opposite ends. For instance, a rivet or pivot pin, one or more wing nuts, standard hex nuts, or like fastener or fasteners may be used as a means for securing adjacent ends of the two clamp body halves, 24 and 26, together and/or for tightening the clamp about the ferrules, 16 and 18, and gasket 20 to exert a desired amount of force thereon.

Figure 1:
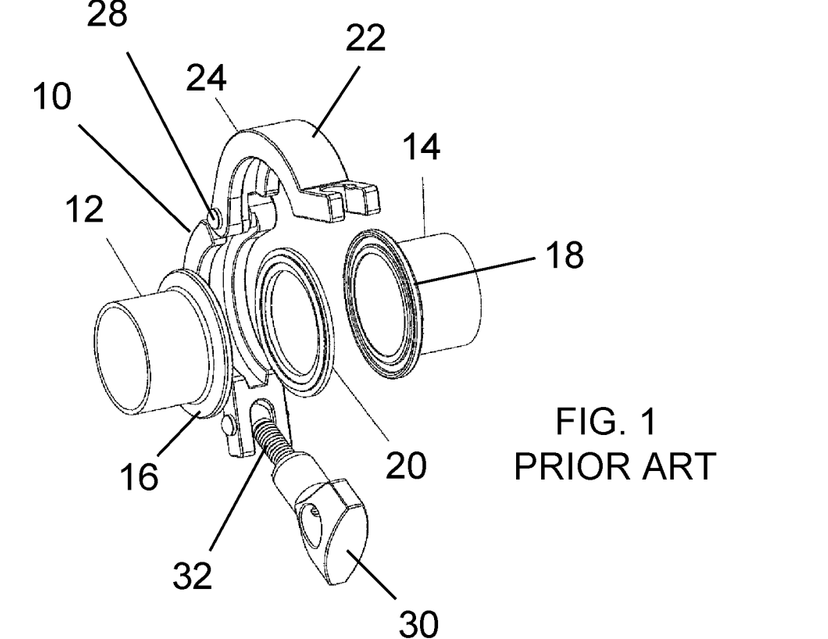
FIG. 1 is an exploded view of a tri-clamp connection according to the prior art.
Figure 2:
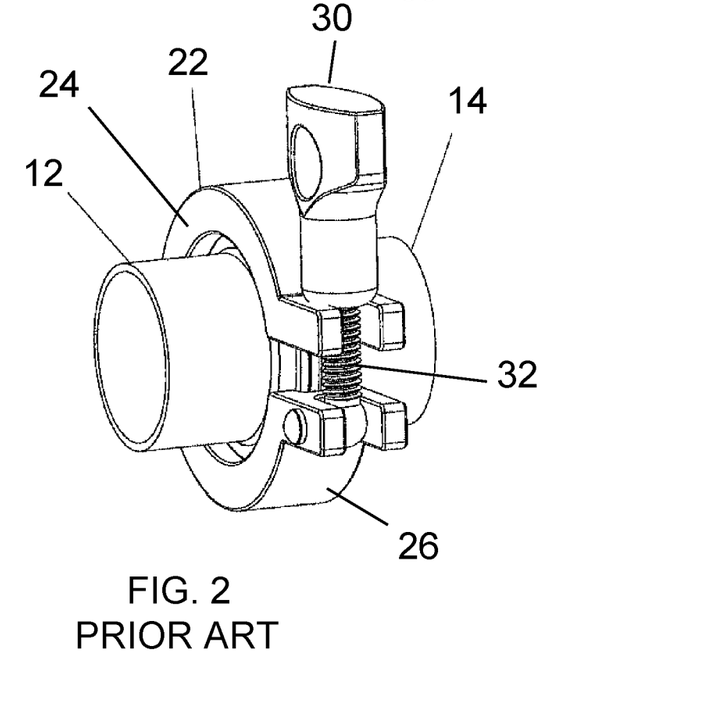
FIG. 2 is a perspective view of the tri-clamp of FIG. 1 in an assembled condition.
Figure 3:
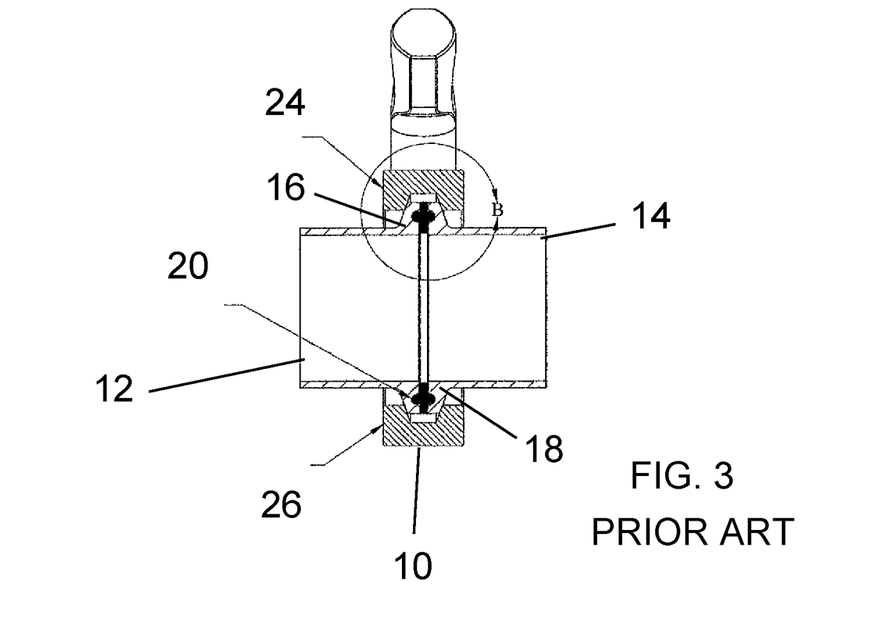
FIG. 3 is a cross-sectional view of the assembled tri-clamp connection of FIG. 2.
Figure 4:
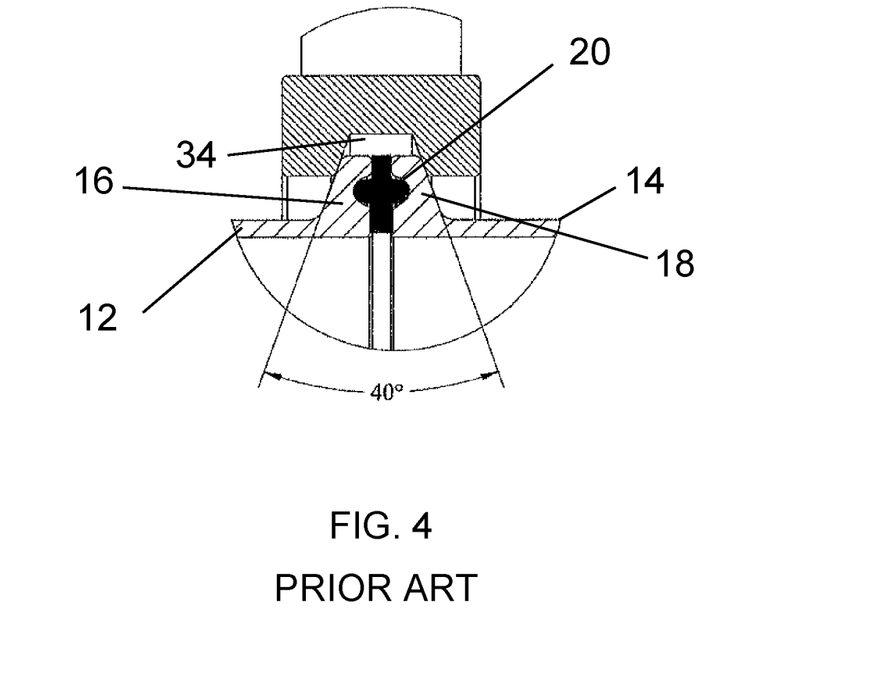
FIG. 4 is a magnified view of part ("B") of the connection shown in FIG. 3.

By way of example, the clamp 22 shown in FIGS. 1-4 includes clamp body halves, 24 and 26, permanently connected together at one end with a pivot pin 28. Thus, as shown in FIG. 1, the clamp 22 can be positioned in an open position to receive and fit about the ferrules, 16 and 18, and gasket 20. Thereafter, the clamp body halves, 24 and 26, may be pivoted about pivot pin 28 to a closed position as shown in FIG. 2, and a wing nut 30 is used to secure the otherwise opposite free ends of the clamp body halves, 24 and 26, together. In the illustrated embodiment, the wing nut 30 is tightened by rotating it onto a threaded shaft 32. Thus, as the wing nut 30 is further tightened and advanced along the threaded shaft 32, the adjacent pair of ends of the clamp body halves, 24 and 26, are drawn closer together resulting in a greater amount of compression of the two ferrules, 16 and 18, and the gasket 20. For instance, see FIG. 3.

Each of the clamp body halves, 24 and 26, may include an internal groove 34 defined by angled side walls that match and mate against angled faces of the ferrules, 16 and 18, when assembled together. For instance, see FIG. 4. Thus, the angled walls defining the groove 34 slide along the angled faces of the ferrules, 16 and 18, and compress the ferrules, 16 and 18, and the gasket 20 together as the clamp body halves, 24 and 26, are drawn together and inward by further tightening of the wing nut 30 on the threaded shaft 32.

According to an embodiment, a cam-lever clamp 40, as shown in FIGS. 5-21, is used in replace of the clamp 22 for being secured about the ferules, 16 and 18, and the gasket shown in FIGS. 1-4 to form a so-called tri-clamp connection or union. Thus, in some respects, the clamp 40 is similar in construction and function relative to the clamp 22. For instance, the clamp 40 has opposite upper and lower (or first and second) clamp body halves that, when positioned or pivoted to a closed position, are able to secure and compress together an assembly of a pair of ferrules and gasket as shown, for instance, in FIGS. 3-4. However, unlike clamp 22, the clamp 40 includes a cam-lever mechanism instead of a wing nut and includes a threadless shaft having an adjustable cylindrical stop sleeve for use in drawing the otherwise free ends of the clamp body halves together. These structural components and their significance are discussed in greater detail below.

Figure 5:
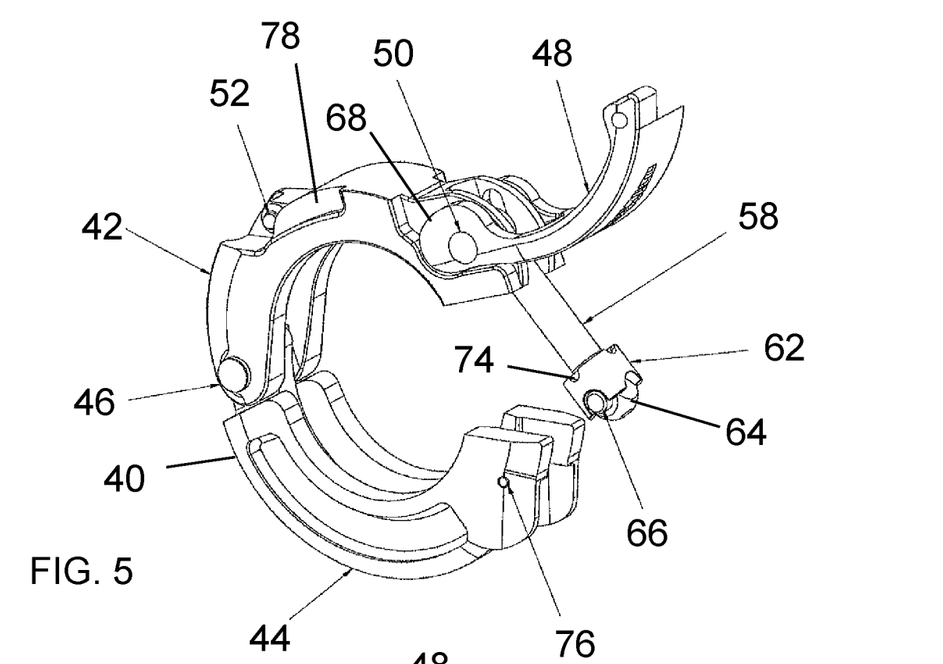
FIG. 5 is a perspective view of a cam-lever clamp in an open position according to an embodiment.
Figure 6:
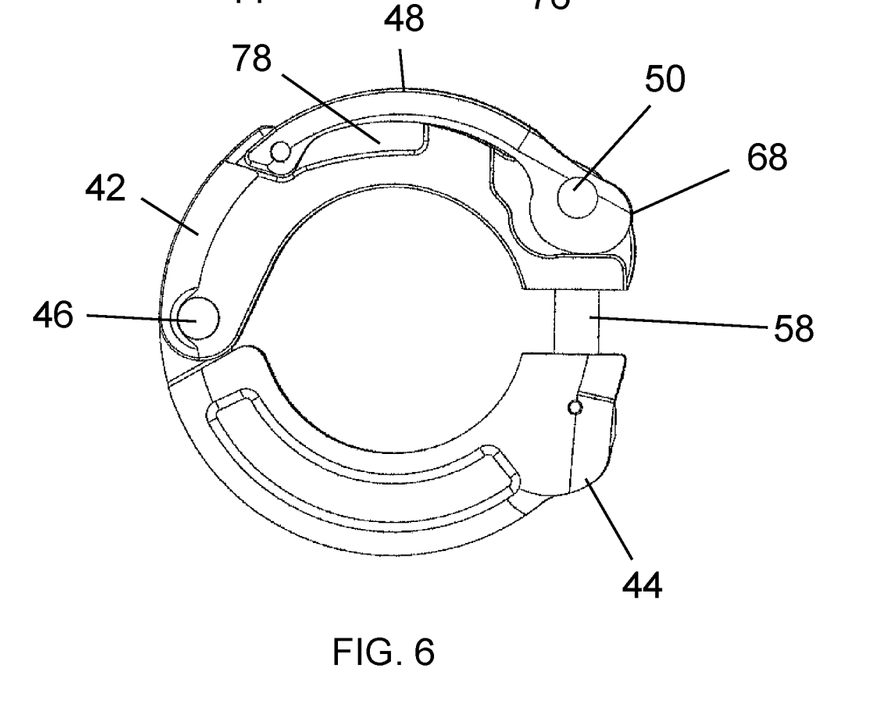
FIG. 6 is a front elevational view of the cam-lever clamp of FIG. 5 in a closed position.
Figure 7:
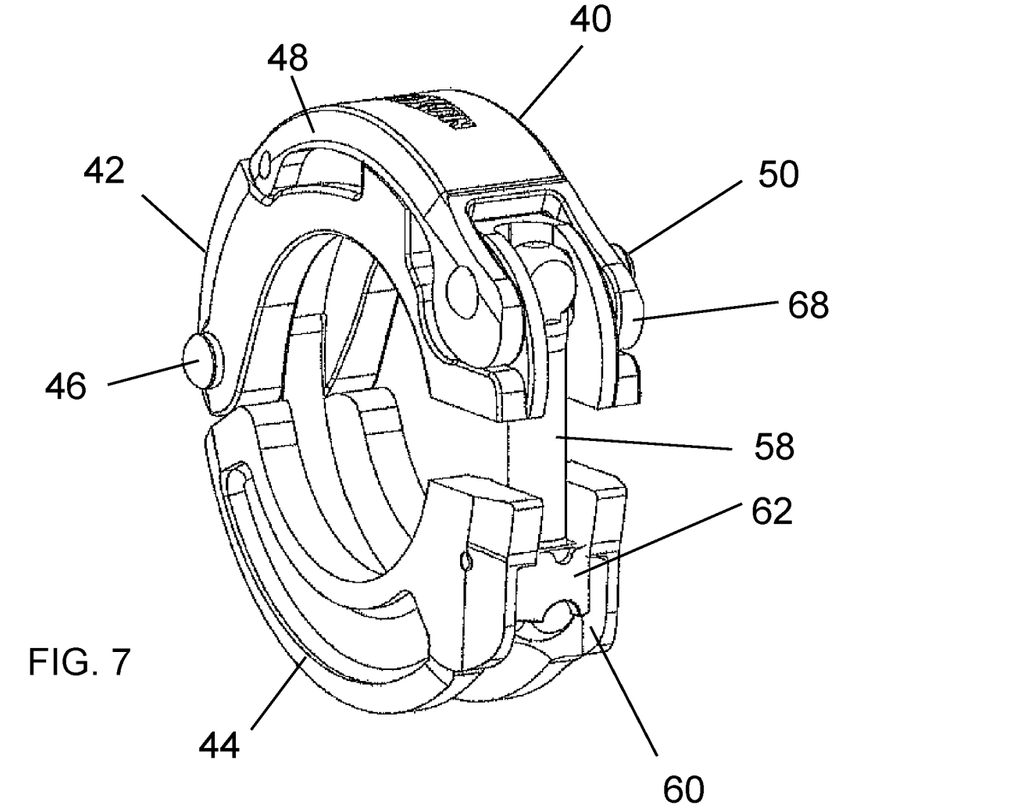
FIG. 7 is a perspective view of the cam-lever clamp of FIG. 5 in a closed position.

As best shown in FIGS. 5-7, the cam-lever clamp 40 may include a first clamp body component 42 and a second clamp body component 44 which when secured together form a substantially ring-shaped clamp. For purposes herein, the first clamp body component will be referred to as an upper clamp body half 42 and the second clamp body component will be referred to as a lower clamp body half 44 when referring to the drawings. However, it should be readily understood that each component can form more or less than half of the clamp and can form a greater or lesser amount of the clamp relative to the other component. Further, for purposes of convenience, the halves may be referred to as upper or lower clamp body halves; however, either component could be considered to have any orientation relative to the other (i.e., upper, lower, right side, left side, etc.)

Figure 14:
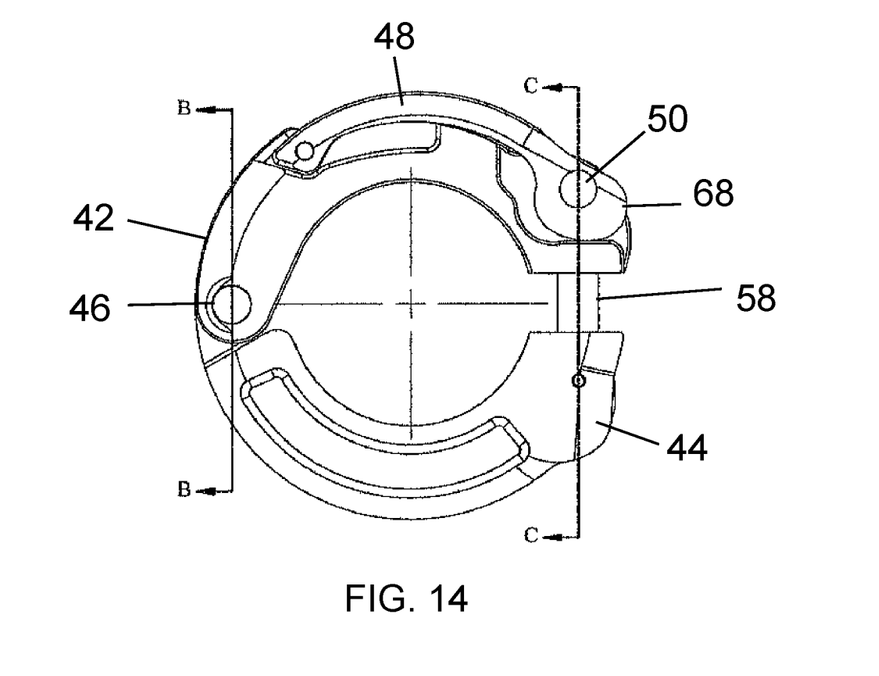
FIG. 14 is a front elevational view of the cam-lever clamp of FIG. 5 in a closed position.
Figure 15:
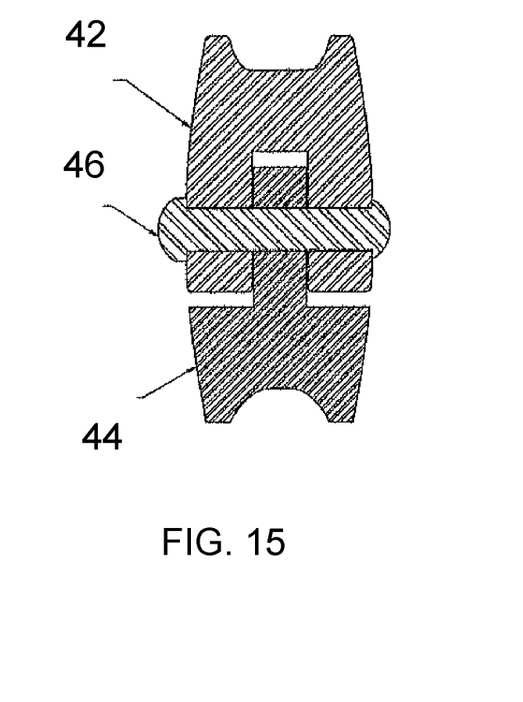
FIG. 15 is a cross-sectional view taken along line B-B of FIG. 14.
Figure 17:
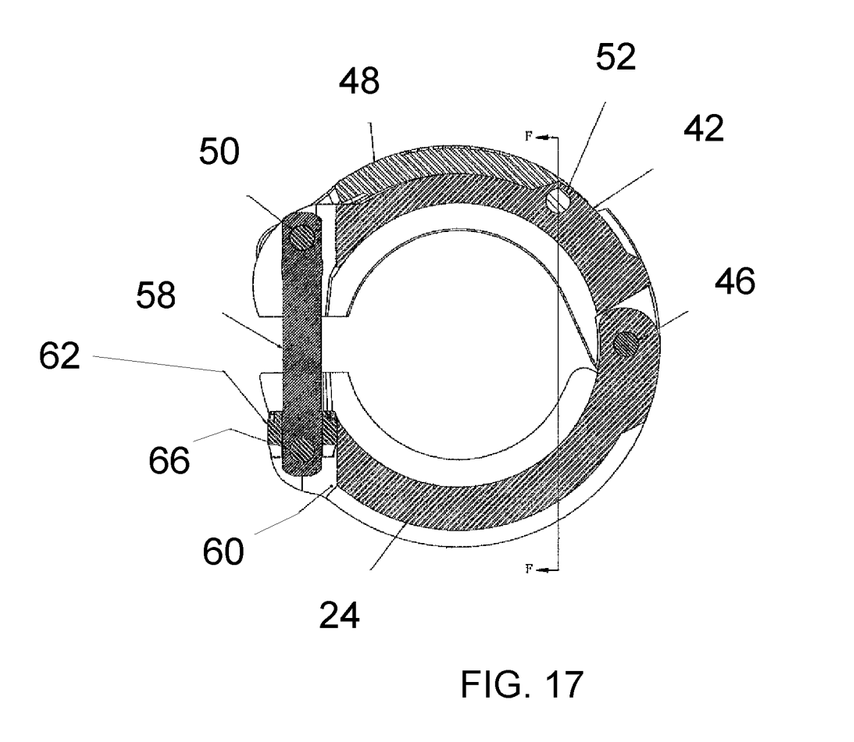
FIG. 17 is a cross-sectional view taken along line E-E of FIG. 16.
Figure 18:
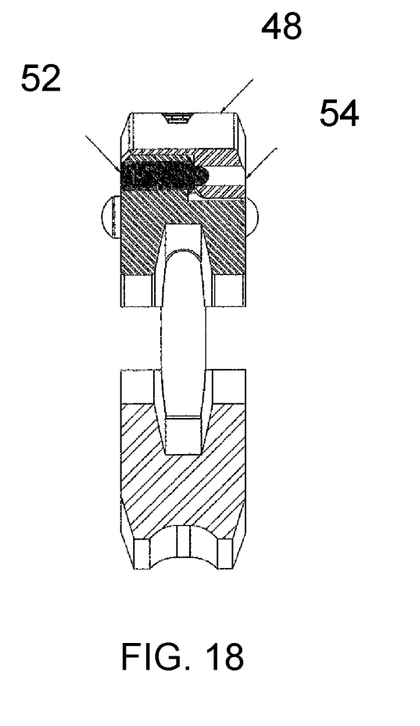
FIG. 18 is a cross-sectional view taken along line F-F of FIG. 17.
Figure 19:
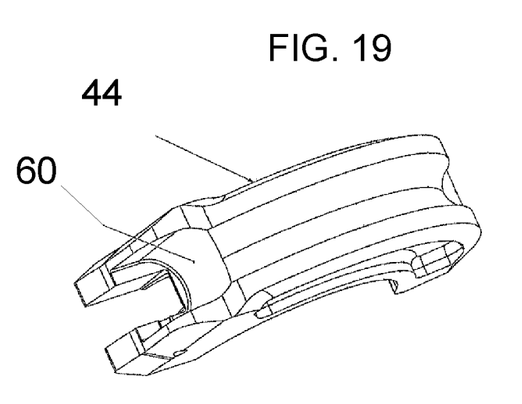
FIG. 19 is a perspective view of an embodiment of an underside of a lower body half of the cam-lever clamp of FIG. 5.
Figure 20:
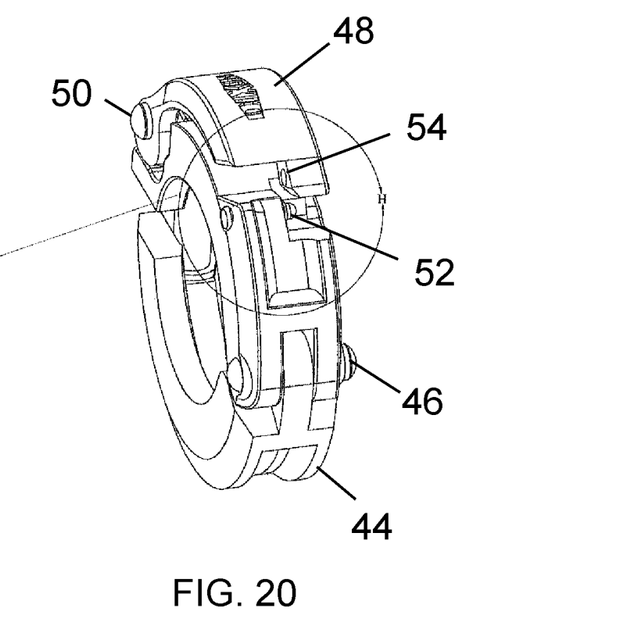
FIG. 20 is a perspective view of the cam-lever-clamp of FIG. 5.
Figure 21:
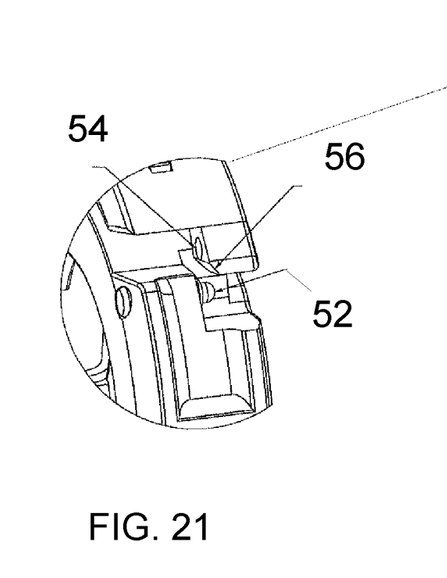
FIG. 21 is a magnified perspective view of a part of the cam-lever clamp shown in FIG. 20.
Figures 22, 23:
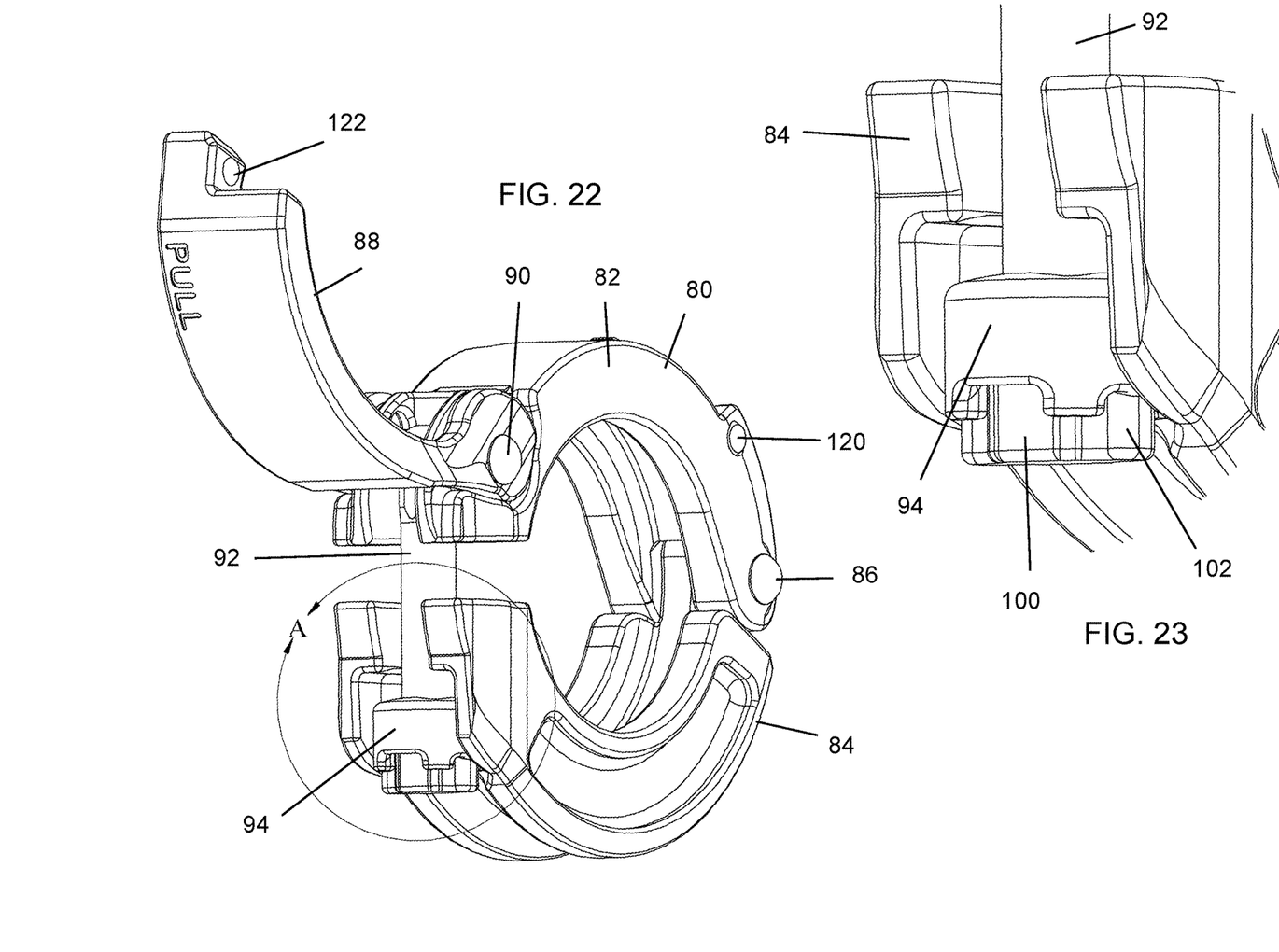
FIG. 22 is a perspective view of an alternate embodiment of a cam-lever clamp with the cam-lever in an open position according to an embodiment.
FIG. 23 is a magnified view of part ("A") of the connection shown in FIG. 22.
Figures 24, 25:
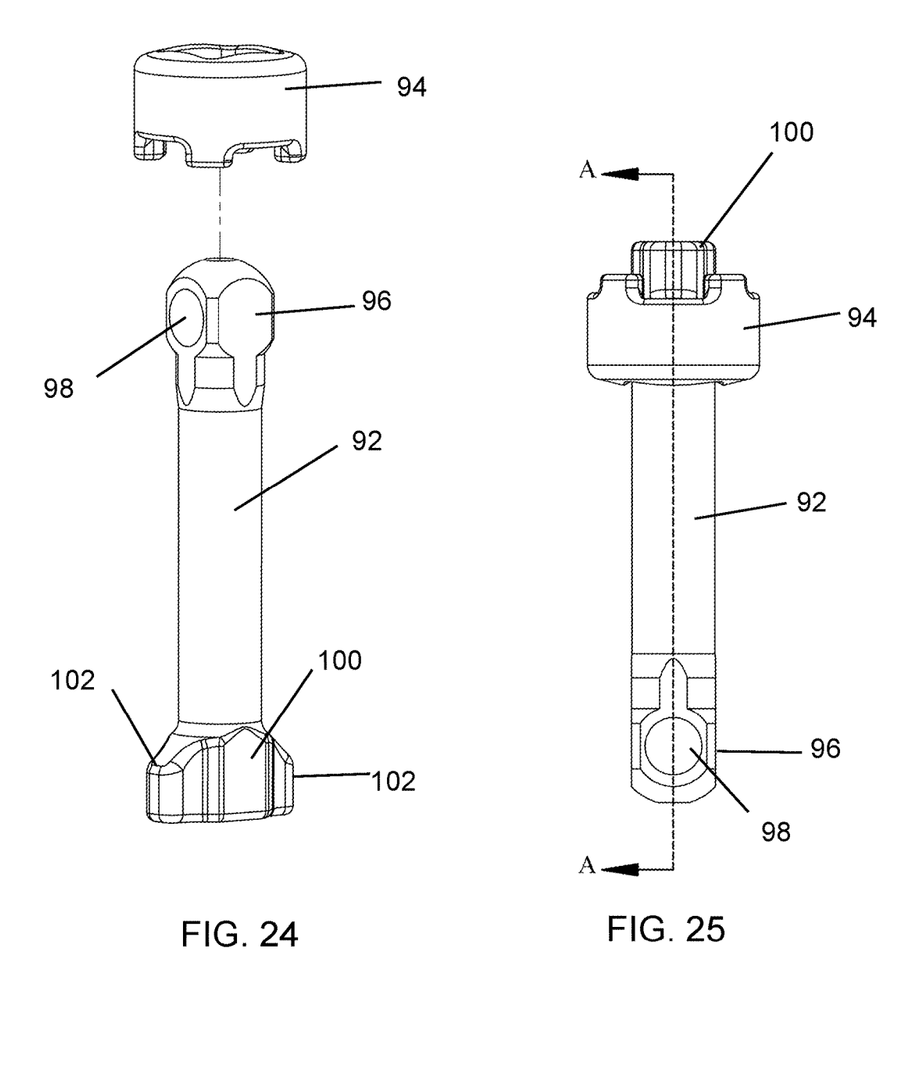
FIG. 24 is an exploded perspective view of an embodiment of a shaft assembly of the cam-lever clamp of FIG. 22.
FIG. 25 is an elevation view of the shaft assembly of FIG. 24.

The clamp body halves, 42 and 44, may be secured together on one side of the clamp 40 with a clamp body rivet or pivot pin 46. The pivot pin 46 enables the upper and lower clamp body halves, 42 and 44, to be pivoted away from each other to a clamp open position to permit ready placement of the clamp 40 about an assembly of a pair of ferrules and gasket and to be pivoted toward each other to a clamp closed position to exert a desired amount of clamping force to compress together the ferrules and gasket. Thus, a pivotable joint is formed between the clamp body halves, 42 and 44. FIGS. 14, 15 and 17 provide further views with respect to the configuration of such a joint.

Figure 16:
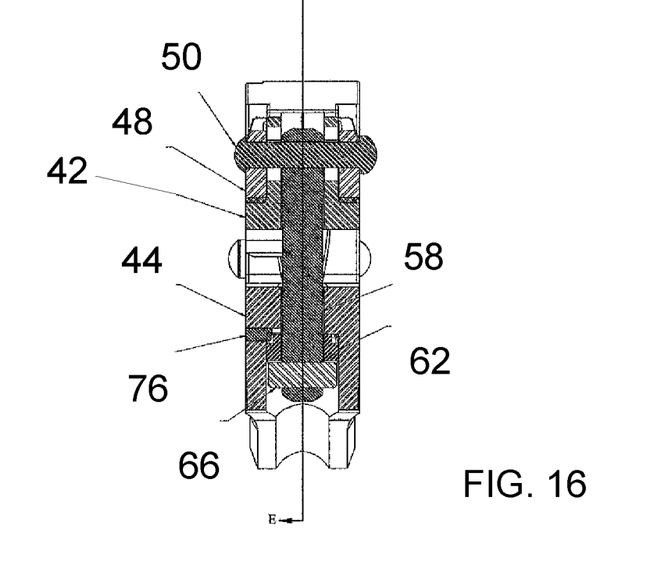
FIG. 16 is a cross-sectional view taken along line C-C of FIG. 14.

The upper clamp body half 42 may include a cam-lever 48 connected thereto with a cam-lever rivet or pivot pin 50 such that the cam-lever 48 can be pivoted away from the upper clamp body half 42 (such as shown in FIG. 5) or can be pivoted into close engagement with the upper clamp body half 42 (such as shown in FIGS. 6 and 7). FIGS. 14, 16 and 17 provide additional views of the cam-lever rivet or pivot pin 50 and its placement.

In addition to the cam-lever 48, the upper clamp body half 42 may also include a locking mechanism that engages the cam-lever 48 when the cam-lever 48 is moved to the closed position as shown in FIGS. 6 and 7 to secure and lock the cam-lever 48 in the closed position. Thus, for instance, the cam-lever 48 may be locked in the closed position as shown in FIGS. 6 and 7 until an appropriate tool or the like is used to unlock the cam-lever 48 enabling movement back to an open position as shown in FIG. 5. A recessed area 78 may be provided on the upper clamp body half 42 to enable a user to grip the cam-lever 48 when in a closed position so that that cam-lever 48 can be pivoted to the open position when unlocked.

According to an embodiment, the locking mechanism on the upper body clamp body half 42 may include a spring-loaded plunger pin 52 that is able to engage and extend within a cam-lever plunger pin receptacle or aperture 54 located on a free end of the cam-lever 48. For example, see FIGS. 5, 18, 20 and 21. Thus, when the cam-lever 48 is pivoted completely to the closed position (i.e., the position as shown in FIGS. 6 and 7), the spring-loaded plunger pin 52 resiliently and automatically extends within the receptacle 54 (for instance, see FIG. 18) and thereby prevents movement of the cam-lever 48 relative to the upper clamp body half 42.

For purposes of gradually depressing the spring-loaded plunger pin 52 from a normal extended position, the cam lever 48 may include a chamfered edge 56 adjacent and slightly ahead of the receptacle 54 such that the spring-loaded plunger pin 52 first contacts the chamfered edge 56 and is gradually depressed to a retracted position against the force of a spring so that the spring-loaded plunger pin 52 can align with the receptacle 54. After the spring-loaded plunger pin 52 aligns with the receptacle 54, it automatically extends to its normal extended position due to the force of the spring and thereby extends within the receptacle 54. In this condition, the cam-lever 48 is locked to the upper clamp body half 42. See FIG. 18.

According to other embodiments, the locations of the plunger pin, receptacle, and chamfered edge can be reversed such that the spring-loaded plunger pin is carried on the cam-lever and the receptacle and chamfered edge is provided on the upper clamp body half 42.

For purposes of connecting together the otherwise free ends of the upper and lower clamp body halves, 42 and 44, (i.e., the ends opposite the pivot pin 46), a shaft 58 extends from the free end of the upper clamp body half 42 and is connected thereto with the cam-lever rivet or pivot pin 50. Thus, the shaft 58, which can be without threads (i.e., threadless), is able to pivot relative to the upper clamp body half 42 as well as the cam-lever 48 about pivot pin 50. For example, see FIGS. 5, 7, 16 and 17. As an alternative, the shaft 58 may be connected to the upper clamp body half 42 with a pivot pin (not shown) that is different and separate from the pivot pin 50 which secures the cam-lever 48 to the upper clamp body half 42.

An opposite free end of the shaft 58 is able to be located within and captured by a receiving slot or pocket 60 located in the free end of the lower clamp body half 44, such as when the clamp 40 is in the closed position (i.e., see FIGS. 6 and 7), and may be unlatched therefrom when the clamp 40 is in the open condition (i.e., see FIG. 5). See FIGS. 5, 7, 16, 17 and 19 for additional views of the shaft 58 and/or pocket 60.

Figure 8:
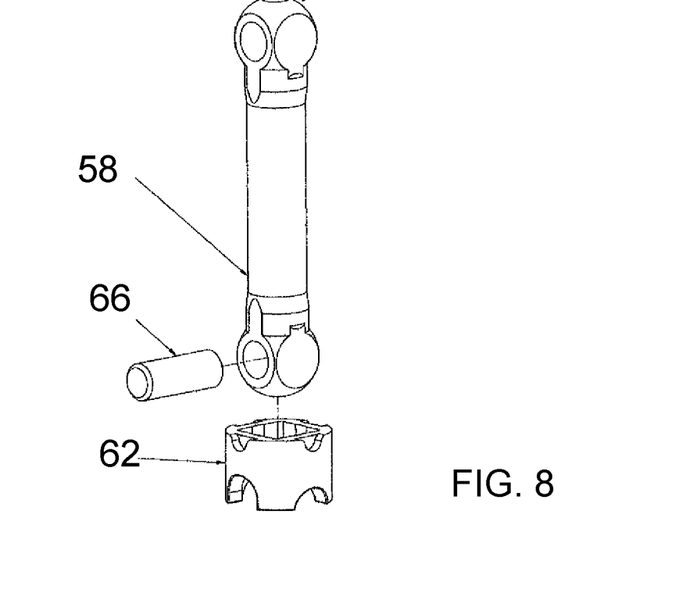
FIG. 8 is an exploded perspective view of an embodiment of a shaft assembly of the cam-lever clamp of FIG. 5.

According to one contemplated embodiment as best shown in FIG. 8, an adjustable stop sleeve 62 may be located on the free end 64 of the shaft 58. For instance, a retaining pin 66 can be used to capture the stop sleeve 62 on the shaft 58 (see FIG. 5). Thus, in this embodiment the shaft is constructed from multiple components (i.e., shaft 58, stop sleeve 62 and retaining pin 66). As best shown in FIG. 7, the stop sleeve 62 can be captured within the receiving slot or pocket 60 of the lower clamp body half 44 when the clamp 40 is in the closed position. According to other alternate embodiments, the shaft 58 may be provided without a stop sleeve 62 or an adjustability feature as provided by the stop sleeve 62. In addition, the shaft 58 could be provided with a stop sleeve, but without a retaining pin.

The stop sleeve 62 may be re-positioned on the shaft 58 to enable adjustment with respect to the amount of separation between the upper and lower clamp body halves, 42 and 44, when the clamp 40 is in the closed position (i.e., when the cam-lever 38 is in the closed and locked position). By way of example, the shaft 58 may be pivoted about cam-lever rivet or pivot pin 50 such that the stop sleeve 62 is located within the receiving slot or pocket 60 of the lower clamp body half 44. This connects the upper clamp body half 42 to the lower clamp body half 44. Then, as the cam-lever 48 is pivoted from an open position (as shown in FIG. 5) to a closed position (as shown in FIGS. 6 and 7) about the cam-lever rivet or pivot pin 50, the upper and lower clamp body halves, 42 and 44, are caused to be drawn closer together. This is due to the shape/profile of a camming portion 68 of the cam-lever 48 that extends about the rivet or pivot pin 50. As the two clamp halves, 42 and 44, are brought closer together, the axial force acting on and compressing the assembly of the pipe ferrules and gasket is increased and thereby produces a liquid-tight seal. The mechanical force necessary to draw the upper and lower clamp body halves, 42 and 44, together is generated by rotation or pivoting of the cam-lever 48 which is interconnected to the shaft 58 via pin 50.

Figure 9:
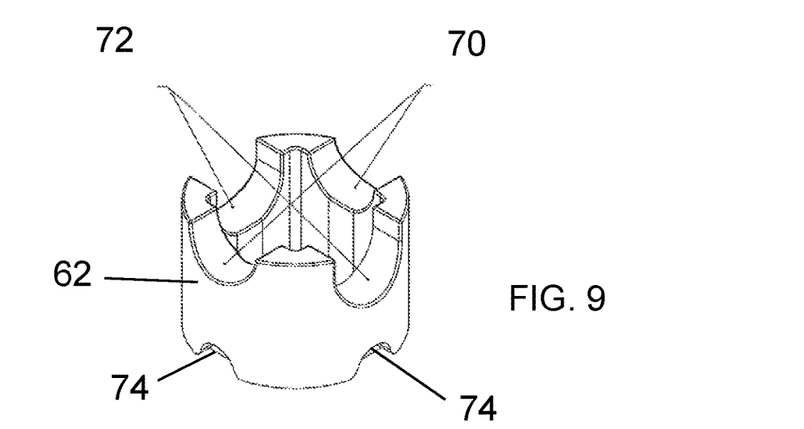
FIG. 9 is a perspective view of an embodiment of a stop sleeve of the shaft assembly of FIG. 8.
Figure 10:
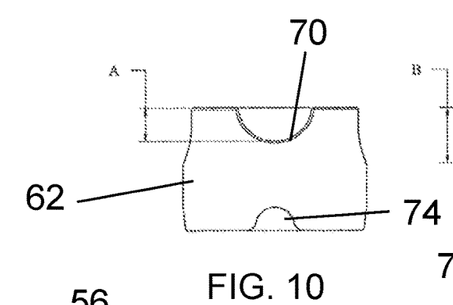
FIG. 10 is an elevational view of the stop sleeve of FIG. 9.
Figure 11:
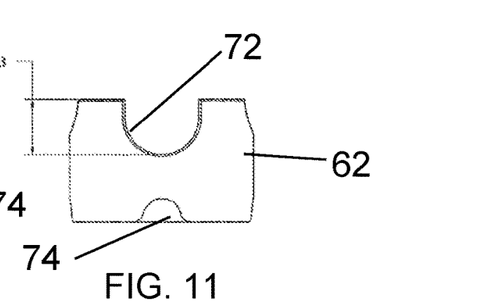
FIG. 11 is an elevational view of the stop sleeve of FIG. 10 rotated by 90° showing a deeper groove.

According to an embodiment as best shown in FIGS. 9-11, the stop sleeve 62 may have two or more sets of radiused grooves that pass completely through the walls of the stop sleeve 62. For example, FIGS. 9-11 show a stop sleeve 62 having two sets, 70 and 72, of radiused grooves; however, more or less sets of grooves can be incorporated in the walls of the stop sleeve. As shown for instance in FIG. 5, one of the sets of grooves engages about the stop sleeve retaining pin 66. As best shown in FIGS. 10 and 11, one of the sets of grooves extends to a first depth (A) (see FIG. 10) and the other set of grooves extends to a second depth (B) (see FIG. 11) such that depth (B) is greater than depth (A). Accordingly, depending upon which set of grooves is aligned to engage the stop sleeve retaining pin 66, the amount of compression generated by the clamp 40 will vary. For example, if the pin 66 engages the grooves 70 of depth (A), the clamp body halves, 42 and 44, will be brought closer together and will exert a greater pre-determined force on the ferrules and gasket. Alternatively, if less force is required or desired, the pin 66 can engage with the grooves 72 of depth (B) which will result in the exertion of less pre-determined force on the ferrules and gasket.

Figure 12:
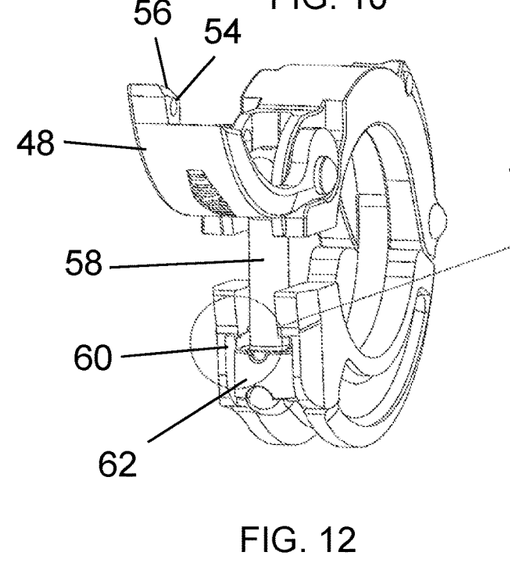
FIG. 12 is a perspective view of the cam-lever clamp of FIG. 5.
Figure 13:
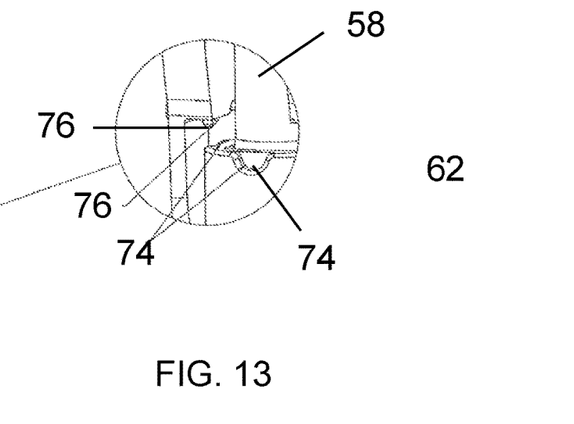
FIG. 13 is a magnified perspective view of a part of the cam-lever clamp shown in FIG. 12.

At an end of the stop sleeve 62 opposite the groove sets, 70 and 72, slots 74 are formed in the outside wall of the stop sleeve 62. For instance, with respect to a stop sleeve 62 having two sets of grooves (four grooves in total as show in FIG. 9), there may be four slots 74 spaced apart along the outside diameter of the stop sleeve 62. In the embodiment shown in FIG. 9, the slots 74 are aligned with the grooves, 70 and 72, and are equally spaced apart (at every 90° rotation of the stop sleeve 62). As best shown in FIGS. 12 and 13, as the cam-lever 48 is moved toward the closed position, at least one locking pin 76 extending within the receiving slot or pocket 60 of the lower clamp body half 44 extends within one of the slots 74 in the outer diameter of the stop sleeve 62 to prevent movement of the shaft 58 and stop sleeve 62 out of the receiving slot or pocket 60. See, for instance, FIG. 16.

Preferably, as shown for instance in FIG. 6, the clamp 40 has a smooth outer profile. By way of comparison, conventional clamps for tri-clamp style unions have exterior geometries that are dictated and limited by relatively-large wing nuts and/or other obtrusive tightening mechanisms as well as large hinge joints. These large obtrusive components of conventional clamps produce a resulting geometry that can protrude significantly outward from the exterior radius of the clamp body halves. For instance, see the wing nut 30 in FIG. 2. This obtrusive geometry can cause operational issues for users in certain circumstances. For instance, if a user is utilizing a conventional single pin style clamp to join two sections of hose with ferrule, the wing nut or tightening mechanism can become caught on other objects such as equipment or stairs while the hose is being dragged on the floor of the plant or up and down platform stairs in processing plants. This can create safety concerns for the user as well as compromise the mechanical integrity of the fitting union if the wing nut becomes loosened or the mechanism becomes damaged.

Accordingly, clamp 40 as shown in FIGS. 6 and 7 can maintain a smooth and more cylindrical profile when the clamp 40 is installed on mating ferrules and the cam lever is in the closed position. This cylindrical profile allows hoses that utilize this clamp to easily roll or slide on surfaces and helps to eliminate issues with the clamp being caught on objects or equipment during use. Thus, the clamp 40 can provide this safety feature in comparison to conventional clamps.

In addition, clamps utilizing a wing nut design or standard hex nut as a tightening mechanism require that the wing nut or hex nut be tightened to a specific torque value in order to maintain the rated pressure value of the clamp. The correct torque value applied to the wing nut or hex nut produces the proper amount of compression on the gasket. For a wing nut style clamp to be torqued properly, a special tool has to be adapted to a torque wrench in order to tighten the nut to the proper specification. Some users may not have these tools readily in hand. These clamps may be installed and removed constantly throughout the day at processing facilities and many of the operators may simply tighten the wings nuts by hand, or in the case of the clamps using a standard hex nut, they simply tighten the hex nut with a wrench until they feel it is acceptable. These designs may create safety concerns as many times the operator may not be sure of how much to tighten the wing nut or hex nuts.

Clamps that may utilize a cam-lever for tightening, typically also utilize a cam lever that may thread onto a shaft. These may also have the same problem as discussed above relative to the use of a standard wing nut or hex nut. The amount that you thread the cam-lever onto the shaft is open to interpretation by the user. If the user threads the cam-lever on only slightly and then closes the cam lever from the open to the closed position, the union may not hold pressure. In contrast, if the lever is threaded onto the shaft too much and then closed, the gasket or ferrules may become damaged from over-compression.

Accordingly, the clamp 40 may utilize the threadless shaft 58 with an adjustable stop sleeve 62 and the cam-lever 48 with a unique camming profile 68 at the base of the cam-lever 48 to create compression on the ferrule/gasket assembly as the cam-lever 48 is moved from the open position to the closed position. As the cam-lever 48 is moved from the open to the closed position, it draws the upper and lower clamp body halves, 42 and 44, together by means of the assembly of the threadless shaft 58, stop sleeve 62, and retaining pin 66 and consistently generates a desired and predetermined compression required. The stop sleeve 62 has two or more unique sets of radiused grooves that allow the amount of compression to be incrementally adjusted by the user without the use of a threaded shaft or threaded cam-lever. The grooves may be precisely designed so that one set of grooves allows for the minimum allowable compression required for a safe, liquid-tight seal, and the other set of grooves allows for the maximum allowable compression without over-compressing the gasket. In this case, an operator does not need to consider how tight the wing nut, hex nut, or threaded cam lever should be and does not need any special tools to accomplish this task. According, embodiments disclosed herein can provide an important safety improvement and ease of use improvement relative to conventional clamps.

Still further, many facilities that utilize tri-clamps have applications or operations in which a clamp that is resistant to tampering is desired. For instance, the clamp should allow only an authorized user with a special tool to be able to open the clamp. The wing nut style clamp does not prevent anyone from being able to loosen the wing nut which can create safety concerns. Many facilities that desire a tamper resistant clamp may use either some type of special additional locking device or may use a bolted style hex nut clamp because both require some type of additional tool to be able to open the clamp, thereby preventing an unauthorized user from opening the clamp.

The clamp 40 disclosed herein can utilize a spring-loaded plunger pin 52, incorporated into the upper clamp body half 42, to engage into an aperture or receptacle 54 at the end of the cam-lever 48. After the plunger pin 52 is engaged into the receptacle 54 in the cam-lever 48, the clamp 40 is prevented from being opened. To open the clamp 40, a tool of slightly smaller diameter than the receptacle 54 is inserted through the receptacle 54 to depress and retract the spring-loaded plunger pin 52. With the plunger depressed, the cam-lever 48 can be moved to an open position and the clamp may be removed. This locking arrangement can provide a significant advantage over the use of a secondary locking device which may require two additional components to lock the clamp. Such components may also not be integral to the clamp making it more cumbersome for users. A bolted style clamp may be tamper-resistant in that a user would need a special wrench in order to remove the clamp, but the ease of assembly and disassembly of such a clamp is inferior as compared to clamp 40 disclosed herein having an automatic self-locking mechanism.

Another contemplated embodiment of a cam-lever clamp 80 is shown in FIGS. 22-33. The clamp 80 is similar to clamp 40 in that the clamp 80 includes opposite clamp bodies, 82 and 84, secured together at one end with a pivot pin 86. In addition, the clamp 80 includes a cam-lever 88 secured to clamp body 82 with a pivot pin 90.

The clamp 80 has a shaft 92 provided with a stop sleeve 94 that is retained on the shaft 92 without the use of a retaining pin. In this embodiment, the shaft 92 and stop sleeve 94 are initially assembled by insertion of the stop sleeve 94 over an end 96 of the shaft 92. See FIG. 24. The end 96 of the shaft 92 has a channel 98 for passage of a pivot pin, such as pivot pin 90.

Figure 26:
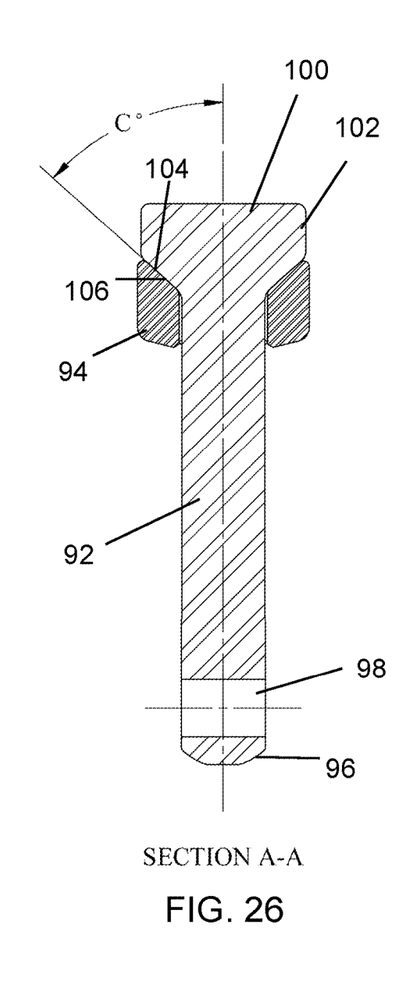
FIG. 26 is a cross-sectional view taken along line A-A of FIG. 25.
Figure 27:
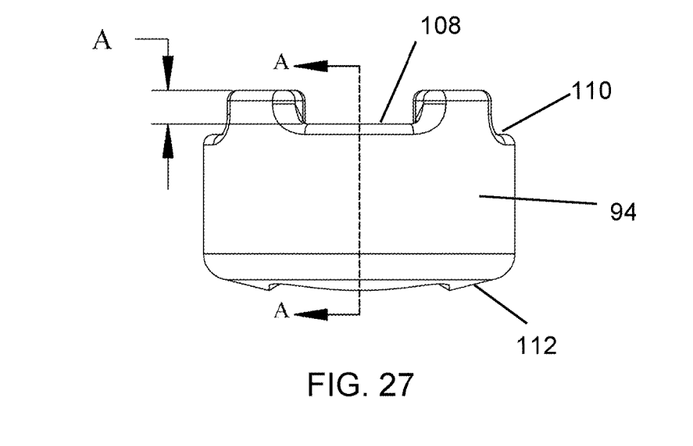
FIG. 27 is an elevational view of a stop sleeve of the shaft assembly of FIG. 24.
Figure 28:
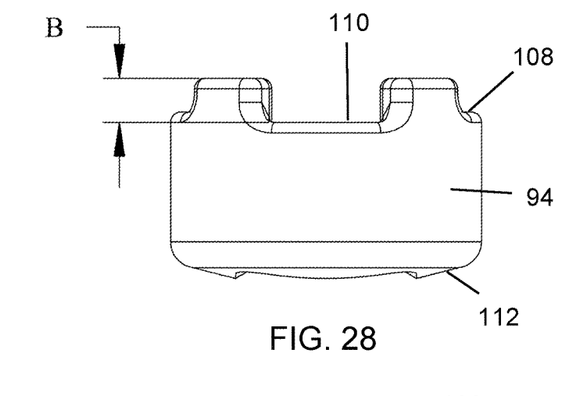
FIG. 28 is an elevational view of the stop sleeve of FIG. 27 rotated by 90° showing a deeper groove.
Figure 29:
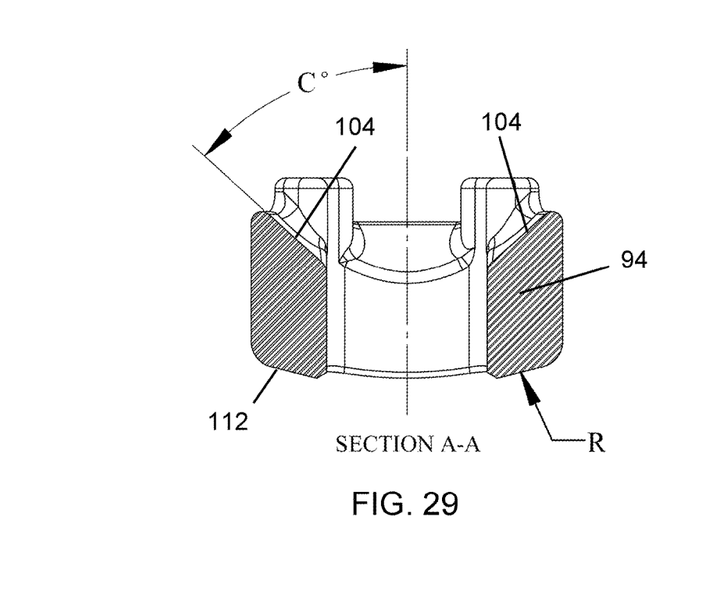
FIG. 29 is a cross-sectional view taken along line A-A of FIG. 27.
Figure 30:
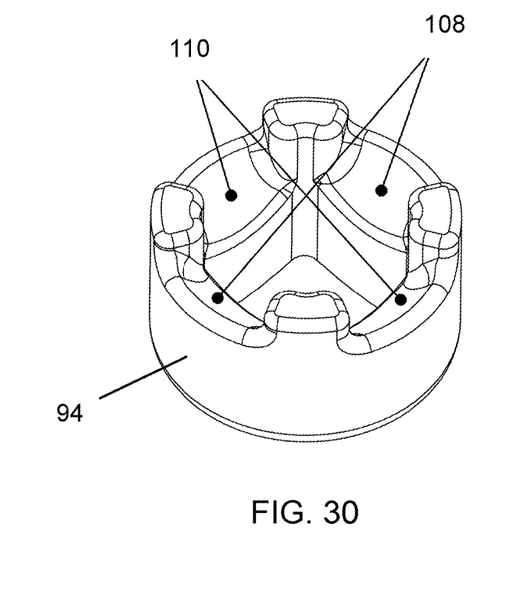
FIG. 30 is a perspective view of the stop sleeve of FIG. 27.
Figure 31:
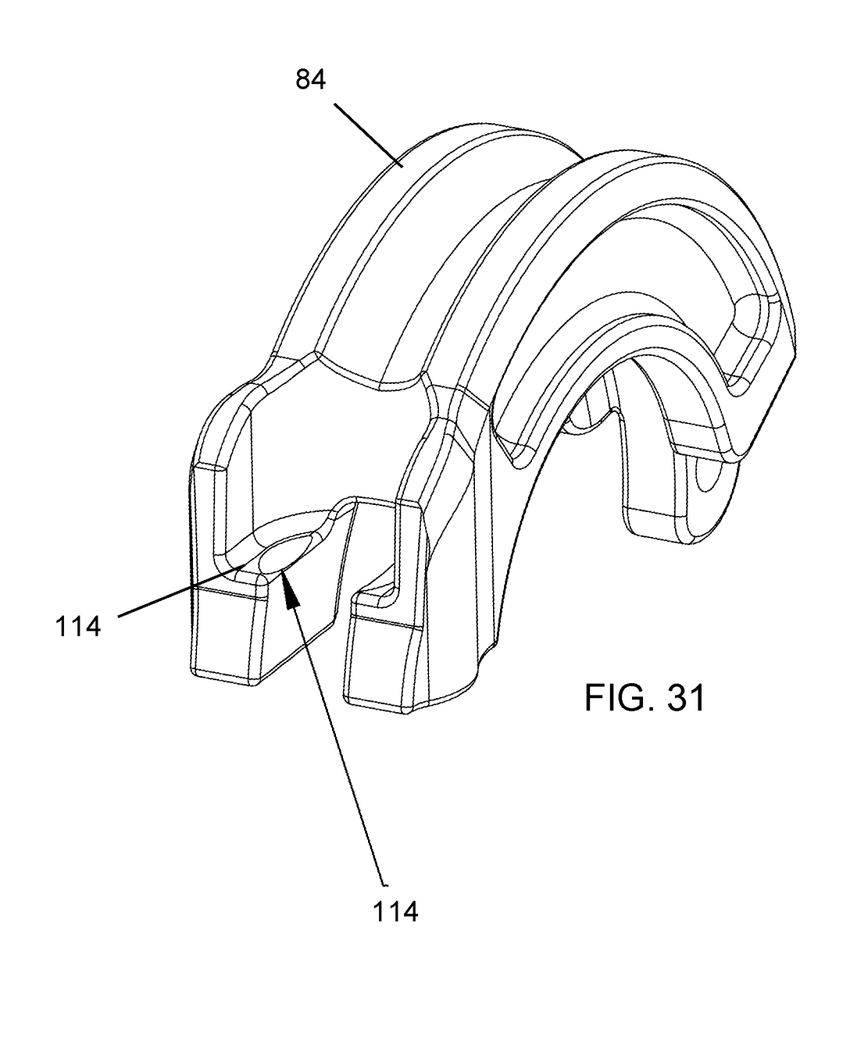
FIG. 31 is a perspective view of an embodiment of an underside of a lower body half of the cam-lever clamp of FIG. 22.
Figure 32:
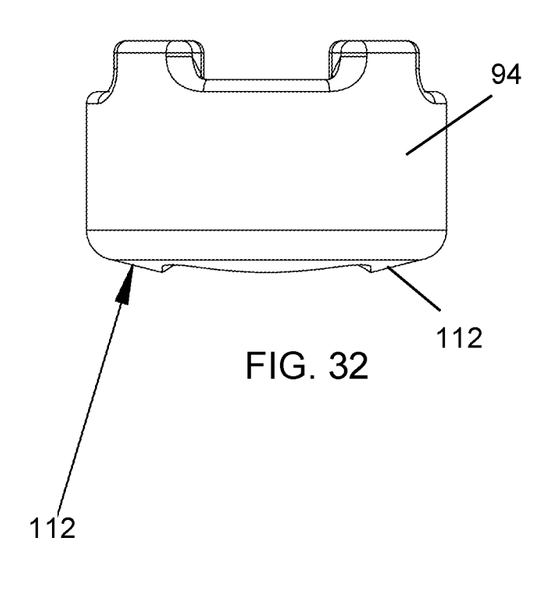
FIG. 32 is an elevational view of a stop sleeve of the shaft assembly of FIG. 22.

The opposite end 100 of the shaft 92 has extensions 102 that extend laterally from the end 100. See FIGS. 24 and 26. When the stop sleeve 94 is slid on the shaft 92 to the end 100, the stop sleeve 94 is captured on the end 100 of the shaft 92 by the lateral extensions 102. See FIGS. 25 and 26. As best shown in FIGS. 26 and 29, the confronting surfaces, 104 and 106, of the stop sleeve 94 and extensions 102 may be tapered or angled, such as at an angle C°.

The surfaces 104 of the stop sleeve 94 that can be positioned to confront the extensions 102 of the end 100 of the shaft 92 are provided by two sets of grooves, 108 and 110, as best shown in FIGS. 27-30. The surfaces 104 of these grooves, 108 and 110, are each angled to cooperatively mate and confront the angled surfaces 106 of the extensions 102. The opposite face 112 of the stop sleeve 94 that confronts the clamp body component 84 has a convex geometry which corresponds to a mating concave geometry 114 in the clamp body component 84. See FIGS. 31 and 32. This keeps the stop sleeve 94 from moving out of the clamp body component 84 when the clamp 80 is in the closed position.

Figure 33:
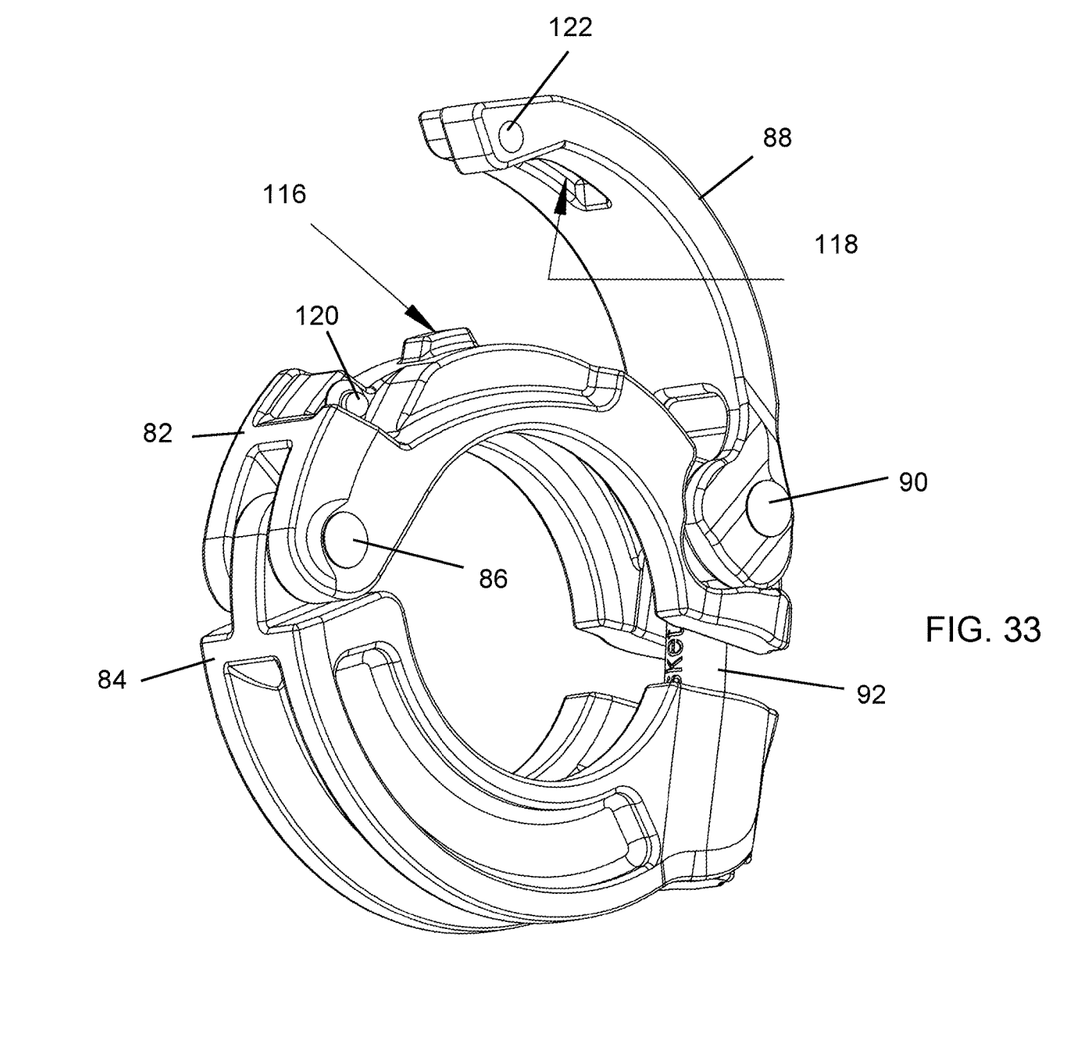
FIG. 33 is a perspective view of the clamp assembly of FIG. 22.

The clamp body component 82 of the clamp 80 as shown in FIG. 33 has an outwardly projecting tab 116 that engages with a receiving slot 118 on the cam-lever 88 of clamp 80 for purposes of preventing the lever 88 from being pried off the clamp body component 82 when the lever 88 is in a closed and locked position on the clamp body component 82, such as when a spring loaded pin 120 of the clamp body component 82 is engaged within a receptacle 122 provided on the lever 88.

As an alternate or further means to lock the lever 88 to the clamp body component 82 in the closed position, a wire or plastic cable (not shown) could be extended through holes or channels (not shown) formed in the lever 88 and clamp body component 82 that align when the lever 88 is in the closed position. The wire or plastic cable may form part of a locking device (not shown) that may be used to securely lock the lever 88 in the closed position.

According to at least some embodiments, the components of the above referenced cam-lever clamps, 40 and 80, may be constructed of 300 series stainless steel, a like metal or alloy, a plastic material, a composite material, a flexible material, or any other material which may be approved by a particular industry.

The foregoing description and specific embodiments are merely illustrative of the principles thereof, and various modifications and additions may be made to the cam-lever clamp by those skilled in the art, without departing from the spirit and scope of this invention.

The invention claimed is:

1. A clamp, comprising:
   a first clamp body component joined to a second clamp body component such that said first clamp body component is able to pivot relative to said second clamp body component;
   a shaft extending from said first clamp body component such that said shaft is able to pivot relative to said first clamp body component, said shaft having a free end receivable within and removable from a pocket formed in said second clamp body component;
   a cam-lever connected to said first clamp body component in a manner permitting said cam-lever to pivot relative to said first clamp body component; and
   a stop sleeve affixed about said free end of said shaft and having at least two sets of grooves formed therein such that said stop sleeve is adjustably affixed to said free end of said shaft to define a pre-determined amount of spacing between said first and second clamp body components when said first and second clamp body components are in a clamp closed position.

2. The clamp according to claim 1, wherein said shaft is threadless.

3. The clamp according to claim 1, further comprising at least one pivot pin that connects said shaft and said cam-lever to said first clamp body component.

4. The clamp according to claim 1, wherein said shaft includes lateral extensions, and wherein each of said at least two sets of grooves of the said stop sleeve is configured to confront said extensions.

5. The clamp according to claim 4, wherein confronting surfaces of the extensions and the grooves are angled relative to a longitudinal axis of said shaft.

6. The clamp according to claim 1, wherein each set of grooves extends to a different depth.

7. The clamp according to claim 1, wherein said stop sleeve is connected to said free end of said shaft with at least one pin, and wherein each of said at least two sets of grooves are configured to receive said at least one pin.

8. The clamp according to claim 1, wherein a face of said stop sleeve includes a convex wall and a mating face of said second clamp body component has a concave wall for preventing displacement of said stop sleeve relative to said second clamp body component when said first and second clamp body components are in a clamp closed position.

9. The clamp according to claim 1, wherein said second clamp body component has a retaining pin, and wherein said stop sleeve has a slot for receiving said retaining pin when said first and second clamp body components are in a clamp closed position.

10. The clamp according to claim 1, wherein, when said first and second clamp components are in a clamp closed position, said first and second clamp components form a ring-shaped clamp having a substantially cylindrical outer peripheral profile without outwardly protruding components.

11. The clamp according to claim 1, wherein a recessed area is defined between said first clamp body component and said cam-lever to permit said cam-lever to be gripped when the clamp is in said closed position.

12. The clamp according to claim 1, wherein the clamp is constructed of 300 series stainless steel, a metal or alloy, a plastic material, a composite material, or a flexible material.

13. A clamp, comprising:
   a first clamp body component joined to a second clamp body component such that said first clamp body component is able to pivot relative to said second clamp body component;
   a shaft extending from said first clamp body component such that said shaft is able to pivot relative to said first clamp body component, said shaft having a free end receivable within and removable from a pocket formed in said second clamp body component; and
   a cam-lever connected to said first clamp body component in a manner permitting said cam-lever to pivot relative to said first clamp body component;
   wherein one of said first clamp body component and said cam-lever has a plunger pin and wherein the other of said first clamp body component and said cam-lever has a corresponding receptacle for receiving and capturing said plunger pin when said cam-lever is in a closed position.

14. The clamp according to claim 13, wherein one of said first clamp body component and said cam-lever has a tab extending therefrom and wherein the other of said first clamp body component and said cam-lever has a corresponding slot for receiving and capturing said tab when said cam-lever is in a closed position.

15. The clamp according to claim 13, wherein said plunger pin is spring-loaded and automatically and resiliently extends within said receptacle when aligned with said receptacle.

16. The clamp according to claim 15, wherein a chamfered edge of one of said first clamp body component or said cam-lever is located adjacent said receptacle.

17. The clamp according to claim 13, wherein said shaft is threadless.

18. The clamp according to claim 13, wherein, when said first and second clamp components are in a clamp closed position, said first and second clamp components form a ring-shaped clamp having a substantially cylindrical outer peripheral profile without outwardly protruding components.

19. The clamp according to claim 13, wherein a recessed area is defined between said first clamp body component and said cam-lever to permit said cam-lever to be gripped when the clamp is in said closed position.

20. The clamp according to claim 13, wherein the clamp is constructed of metal, an alloy, 300 series stainless steel, a plastic material, a composite material, or a flexible material.

* * * * *